United States Patent
Maines

[19]

[11] Patent Number: 5,964,476
[45] Date of Patent: Oct. 12, 1999

[54] SHOCK ABSORBING FIFTH WHEEL

[76] Inventor: Ben C. Maines, P.O. Box 3571, Longview, Tex. 75606

[21] Appl. No.: 09/268,928

[22] Filed: Mar. 16, 1999

[51] Int. Cl.[6] .................................................. B62D 53/06
[52] U.S. Cl. ....................................... 280/433; 280/438.1
[58] Field of Search .............................. 280/433, 438.1, 280/439, 440, 441, DIG. 901

[56] References Cited

U.S. PATENT DOCUMENTS

| | | |
|---|---|---|
| 1,334,113 | 3/1920 | Norton . |
| 1,424,496 | 8/1922 | Liedabrand . |
| 1,623,179 | 4/1927 | Greer . |
| 1,908,711 | 5/1933 | Kuchar . |
| 2,053,812 | 9/1936 | Bradshaw . |
| 2,093,761 | 9/1937 | Kramer . |
| 3,868,098 | 2/1975 | Coombs .................................. 280/487 |
| 4,721,323 | 1/1988 | Czuk et al. ............................. 280/433 |
| 4,991,864 | 2/1991 | Potsch .................................... 280/441 |
| 5,411,281 | 5/1995 | Poirier ................................. 280/801.1 |
| 5,421,599 | 6/1995 | Maines ................................. 280/406.2 |
| 5,980,728 | 4/1999 | Zim ........................................ 280/433 |

*Primary Examiner*—Lanna Mai
*Assistant Examiner*—Jeff Restifo
*Attorney, Agent, or Firm*—C. W. Alworth

[57] ABSTRACT

A shock absorbing fifth wheel which absorbs transmitted shocks between two vehicles. A plurality of springs absorbs directional shocks, and a plurality of roller bearings carries vertical (gravity) and side (lateral) loads so that the shock absorbing quality is not compromised by dirt, dust or grit between bearing surfaces. The apparatus may be adjusted readily by the user or manufacturer for varying loads and shock absorbing qualities.

12 Claims, 14 Drawing Sheets

SHOCK ABSORBING FIFTH WHEEL

FIELD OF THE INVENTION

The invention generally relates to vehicle towing and more specifically relates to a fifth wheel shock absorber system for trailers which reduces stress on both the towing vehicle and the towed vehicle resulting in a safer combination of towed and towing vehicles.

BACKGROUND OF THE INVENTION

The fifth wheel coupling concept, used by the heavy trucking industry, has been adapted for use by light trailers in combination with light duty trucks, such as pickups. The light duty fifth wheel usually utilizes a standard trailer hitch and ball rather than the rotating king-pin assembly used in the heavy trucking industry. The light duty fifth wheel is generally employed with long-neck trailers for hauling loads and livestock. Quite often the long-neck is shortened and used with a recreational vehicle, camper, trailer or mobile home. In this case the front extension of the recreational vehicle actually forms the long-neck required for this type of trailer and towing vehicle combination.

Tremendous mechanical abuse is suffered by both vehicles when one vehicle is towing another. Road conditions such as bumps, chuckholes, dips and wallowing pavement are all transmitted between the towed vehicle and towing vehicle by a fifth wheel coupler. This invention improves the fifth wheel coupler by adding a shock absorbing device specifically designed to reduce shock, tugging, pushing, and surge loads that are transmitted between and imposed on the two vehicles. The fifth wheel coupler adds an important safety feature in that reduction of these transmitted loads substantially eliminates the possibility of metal fatigue in the coupler assembly.

A shock absorbing device would be very useful when used in combination with livestock or horse trailers, because animals are very sensitive to shock and movement while contained within the confines of trailers. A shock absorber device will lessen the back and forth bounce which is transmitted between two vehicles thus improving traveling conditions for prize animals.

A properly designed towing coupler used between a towed vehicle and a towing vehicle should have the following features:

a) the coupler must be able to transmit the towing force from the towing vehicle to the towed vehicle in order to allow the towed vehicle to be pulled along and, b) the coupler should reduce or eliminate the transmitted shock loads between the two vehicles caused by encountered road conditions.

PRIOR ART

Towing coupler systems taking the form of a fifth wheel are well known in the art and the prior art technology will be discussed. The closest prior art known to the Applicant includes U.S. Pat. No. 1,334,113 (Norton), U.S. Pat. No. 1,424,496 (Liedabrand), U.S. Pat. No. 1,623,179 (Greer), U.S. Pat. No. 1,908,711 (Kuchar), U.S. Pat. No. 2,053,812 (Bradshaw), U.S. Pat. No. 2,093,761 (Kramer), U.S. Pat. No. 3,868,098 (Coombs), U.S. Pat. No. 4,991,864 (Potsch), and the inventor's own U.S. Pat. No. 5,421,599 (Maines, including its prior art which is incorporated by reference) which specifically goes to a shock absorbing tow coupler bar.

In the Norton device a bar is used to support the shock absorbing springs and to bear the vertical (gravity) load. Thus, the shock absorbing capability of the springs is compromised by lateral drag along the bar caused by the vertical load. Further, Norton provides no dirt protection; thus, the shock absorbing quality of the springs can become very ineffectual if and when dirt binds lateral movement.

The Liedabrand device is designed to absorb the shock load imposed when permanently coupling the towing vehicle to a trailer or cart and does not envision the need to release the coupled vehicles from one another. Liedabrand provides a series of roller bearings but only for a turntable that allows for free turning of the trailer about the fifth wheel. Again the vertical (gravity) load rides on a bearing surface like Norton. Further, and like Norton, Liedabrand provides no dirt protection; thus causing the springs to become ineffectual in the presence of dirt.

The Greer device uses a single spring to shift the downward (gravity) load imposed by a trailer to the front of the towing vehicle. Greer states that the device provides shock absorbing capability; however, the shock absorbing capability is generally in the vertical direction (gravity) via a plurality of vertical coiled springs. Some lateral shock absorbing may be accomplished by side to side movement of the coiled springs. But in reality, the actual springs are really independent of the fifth wheel itself and are the coupling means between a tow bar and the trailer.

Kuchar discloses a tow bar device which provides no vertical (gravity) load bearing surface resulting in compromised lateral shock absorbing. Kuchar provides some vertical shock absorbing quality via a vertical spring which controls the vertical load about a pivot point. Again close inspection shows that the vertical (gravity) load still rides on a bearing surface which will compromise lateral motion and which could cause the lateral shock absorber to become ineffectual in the presence of dirt.

Bradshaw discloses a more modern type fifth wheel which still utilizes a king pin and a series of lateral shock absorbing springs. Again like the prior art, there is no dirt protection and the vertical (gravity) load rides on the spring retaining bars or on a flat surface. Thus, the lateral shock absorbing quality is compromised and may become ineffectual in the presence of dirt.

Kramer discloses a ball and socket fifth wheel device. He recognizes the vertical (gravity) load bearing problem but only provides a flat lubricated sliding surface. The friction between the two surfaces will compromise the shock absorbing quality. Again the presence of dirt and grit will interfere with the sliding motion between the bearing surfaces and the shock absorbing quality will become ineffective.

Coombs discloses a shock absorbing hitch. Again the vertical (gravity) load is slidingly distributed which compromises the lateral shock absorbing quality. In a similar manner the presence of dirt and grit could render the shock absorbing quality ineffective.

Potsch discloses a shock absorbing spring system for a fifth wheel coupler which is located at the attachment points of a support bar holding the fifth wheel coupler. The attachment points are located on a support-U located over driving wheel wells of the towing vehicle. Again, vertical (gravity) load bearing will compromise the shock absorbing quality of the system and dirt would most likely make the system ineffective.

Maines in his disclosure addresses a shock absorbing system for trailer that is towed using a tow bar. Some provision is made to address the problem of vertical loading and its effect on the shock absorbing quality of the tow bar system; however, the Maines unit is designed to work within a tow bar coupler.

With the exception of the more recent disclosures, none of the prior art envisioned the smooth transfer of stresses caused by modern highway speed conditions. However, even the more recent disclosures do not call for roller bearing transfer of gravity loads; thus, resulting in limited lateral shock absorbing capability. Furthermore, none of the systems disclosed by the prior art are designed to be retrofitted in the bed of a pickup or placed on the frame or bed of any other form of light utility truck.

Thus, there remains a need for a simple fifth wheel shock absorber system that will properly damp shock forces which are transmitted between two vehicles via the fifth wheel coupler and improve the safety and comfort of the user.

SUMMARY OF THE INVENTION

An object of the present invention is to reduce the shock transferred between the two vehicles involved in a towing operation. These and other features will become apparent from the description of this invention, particularly when taken with the appended drawings.

The present invention resolves all the limitations of past devices when applied to towing vehicles on the modern highway in that:

a) the device ensures that optimum shock absorption occurs while the two vehicles are following a straight line path;

b) the device provides for easily adjustable damping coefficients which allows the manufacturer to manufacture one such device to fit all sized loads thus saving the consumer money;

c) the device is easy to manufacturer and thus will save the consumer money;

d) the device solves the problem of compromised shock absorbing due to vertical (gravity) loads;

e) the device protects the moving components from dust and dirt; and, f) the device is simple and easy to maintain.

In general the shock absorbing fifth wheel comprises of four fundamental parts a main housing, a top plate, a series of shock absorbing springs and a floating platform. The bottom plate/lower housing is readily attached in the bed of a pickup, stake bed truck, or other light weight truck and contains the floating platform which is separate from the housing but still attached to the housing by a plurality of horizontal coiled springs. The floating platform rolls laterally on a plurality of roller bearings inside the lower housing. In turn the floating platform holds a standard towing ball which attaches to the trailer towing arm (long-neck or gooseneck) or directly to the trailer. (It would be possible to place a standard heavy truck fifth wheel connection assembly on the floating platform which would allow the device to be used on a standard tractor/rig.) The floating platform and the lower housing are covered by the top plate (attached to the floating platform) which acts as an upper housing keeping dirt, dust, moisture and other contaminants away from the springs and roller bearings.

The floating platform is capable of lateral motion only in one axis or direction. Thus, when the lower housing is installed on the towing vehicle, the device would be positioned so that the lateral motion is in line with the direction of travel of the combination truck/trailer. The shock absorbing springs are also aligned along the same lateral axis. The vertical (gravity) load imposed by the trailer is transferred from the towing ball to the floating platform and from the floating platform through the plurality of roller bearings to the lower housing. Subsequently the vertical load is transferred to the towing vehicle through a set of roller bearings; therefore, the shock absorbing quality of the lateral springs cannot be compromised by dirt between a sliding bearing surface as in the prior art.

The pulling/pushing motion imposed on the towing vehicle by the trailer is transferred through the towing ball to the floating platform. The floating platform transfers this lateral varying load to the coiled springs, which in turn transfer the load to the lower housing/bottom plate and onto the towing vehicle. Thus, time varying lateral loads pass through a set of springs which absorb the shock loading. Side to side loading (perpendicular to the direction of travel) is restrained within the lower housing by a further plurality of roller bearings. Because there are no sliding bearing surfaces, as in the prior art, the shock absorbing quality cannot be compromised.

DESCRIPTION OF PREFERRED EMBODIMENTS

For ease of explanation and understanding of this disclosure when referring to the drawings or figures accompanying this disclosure, the direction "front" would be to the top or at the top of the figure, the direction "back" or "rear" would be to the bottom or at the bottom of the figure. The directions "right" and "left" follow the usual definitions.

Figure 1:
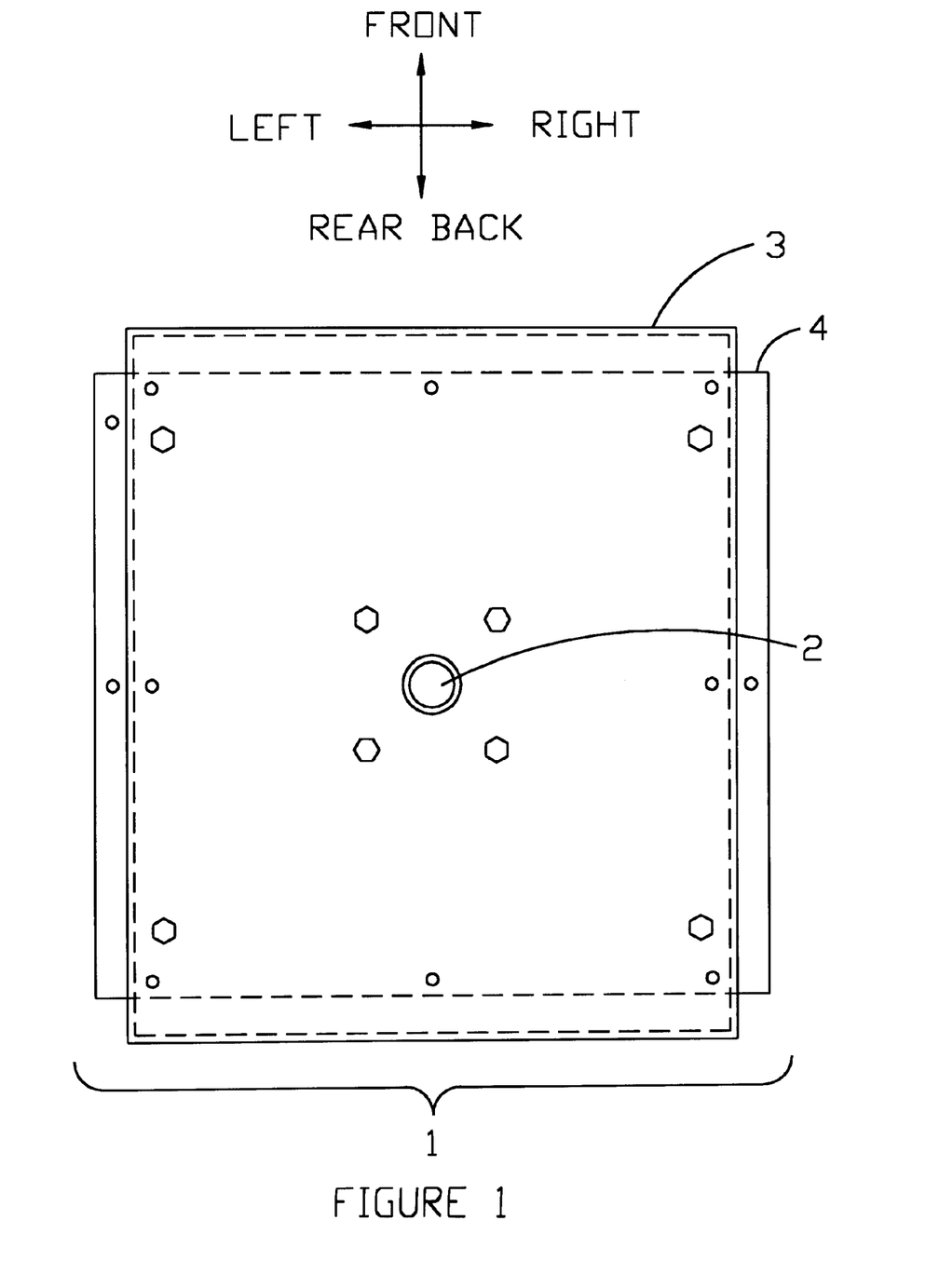
FIG. 1 is a plan view of the improved shock absorbing fifth wheel with the top plate forming the upper housing in place.
Figure 2:
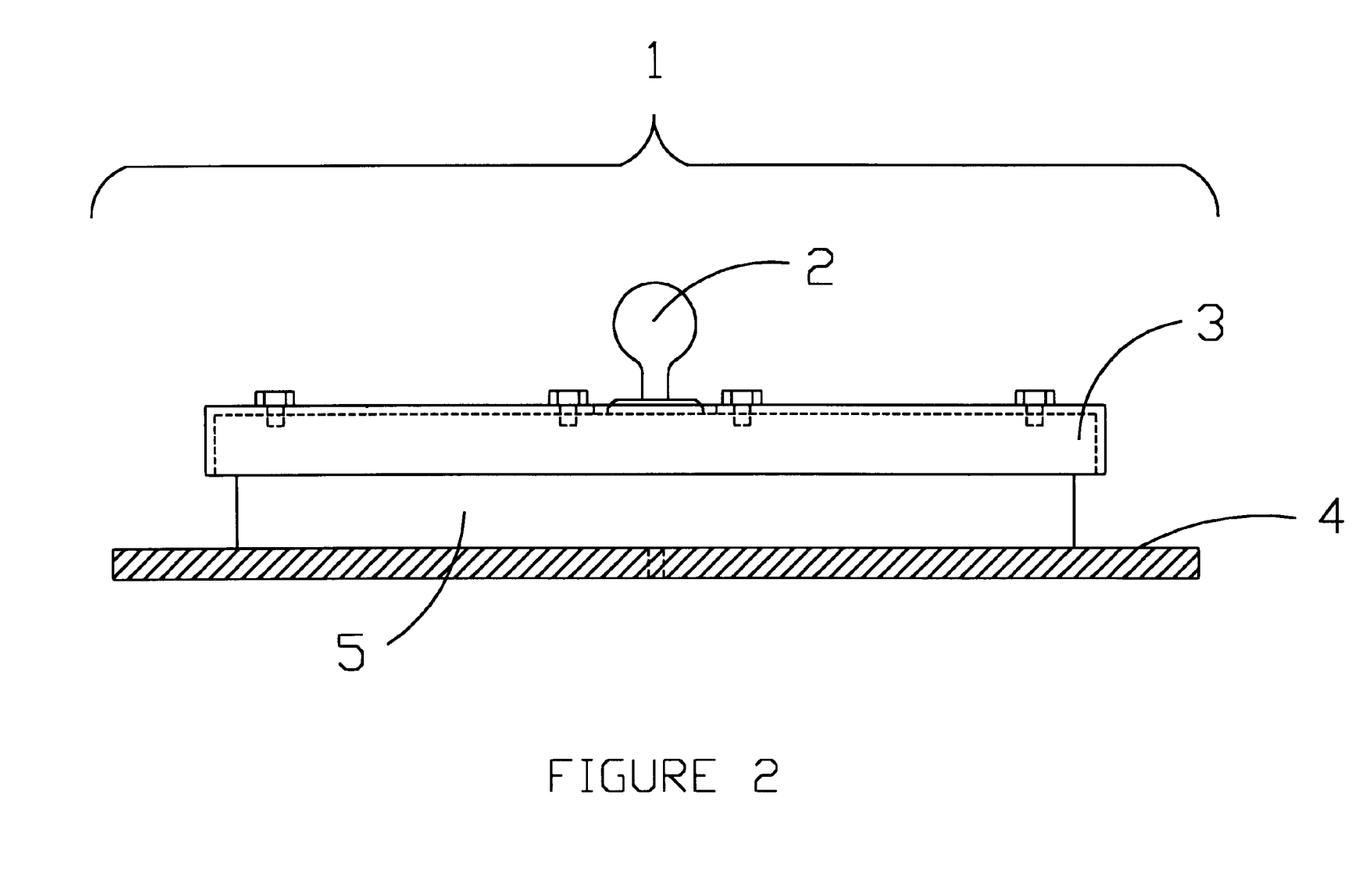
FIG. 2 is an end view of the improved shock absorbing fifth wheel showing the main housing, bottom plate and upper housing in place.

Referring to the Figures and in particular to FIGS. 1 and 2, the shock absorbing fifth wheel device, in general item 1, consists of six basic parts or elements. The main housing assembly, in general item 7, which consists of a base plate, 4, and associated frames sides, in general item 5. The floating platform, which cannot be seen in these figures, in general item 6. The top plate which forms an upper housing assembly, 3, which is attached to the floating platform and a standard trailer ball, 2. Thus, when viewed from the exterior, the upper housing, 3; the trailer ball, 2; part of the base plate, 4; and the lower housing frame, 5, are the only visible items. Contained within the housing are a plurality of roller bearings which transfer vertical (gravity) loads and lateral (side to side) loads from the floating platform to the main housing. In addition to these bearings, there are a plurality of shock absorbing springs and associated bolts. These hidden elements will be explained in due course.

The actual hitch portion of the fifth wheel (the trailer ball) is free to move in the front to back or back to front directions within the main housing. However, as will be seen, free front to back motion is constrained by the shock absorbing qualities of the device. Further, and as will be seen, lateral (being ninety degrees to the direction of vehicle travel) or side to side movement in the right to left or left to right directions is restrained by a plurality of lateral roller bearings.

Figure 7:
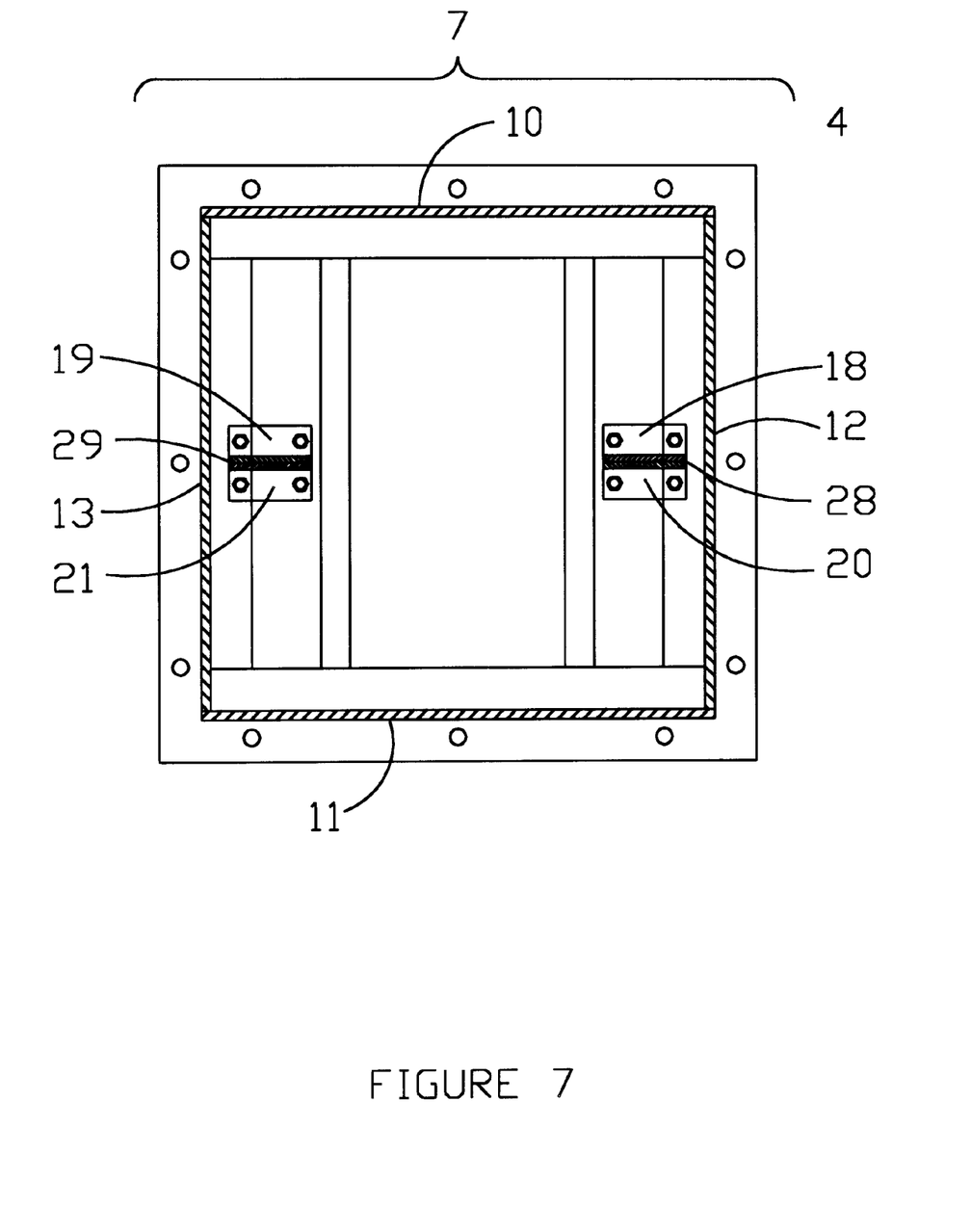
FIG. 7 is a plan view of the lower housing without the floating platform and shock springs.

Turning to FIG. 7, the main housing, in general 7, will first be described. The main housing comprises of twelve parts, not including attachment bolts or the like. Because attachment methods are standard, the attachment methods will not be described in detail. The main housing frame, in general 5, is made from four sections of angle-iron, 10, 11, 12, and 13 which are attached (welded) to a base plate, 4. Four spring bolt holes, 22, 23, 24, and 25, are drilled through the "front" (10) and "back" (11) frame members. The use of these spring bolt holes will be explained.

The size of plate and angle-iron will be determined by the load that the fifth wheel must carry; thus, for a light weight truck, quarter-inch material is sufficient. For heavier uses, three-eights material should be considered; whereas, for lighter loads three-sixteenths material may be used.

Two stiffener/spacer bars, 14 and 15, are welded to the base next to the right and left frame sides. In addition, two load bearing bars, 16 and 17 are welded to the base plate next to the stiffener/spacer bars. It is possible to leave out these four elements, but the inventor believes that added strength is provided and assembly of the unit is facilitated. It is also possible to combine the function of the stiffener/spacer bars with the load bearing bars: it is just a question of available material. The bars are formed from flat plate which has the same dimensions as the main frame angle-iron.

In the prototype device the stiffener/spacer bars were formed from ¼-inch plate or bar stock, the base plate from ½-inch steel (however ⅜-inch would have been suitable), the main frame angle-iron and the floating platform angle-iron from 2×2×¼-inch stock, and the hitch assembly channel was 6-inch standard stock. The approximate dimensions of the floating platform frame is 16½ by 12 inches, the main housing frame is 17½ by 17½ inches, and the base plate is 19½ by 19½ inches.

Note, in the prototype device, the lips of the angle-iron which formed the frame, 5, were turned inward on the base plate, 4. It is possible to reverse the position of the lips, and this is considered as an alternate form of the device. For a light weight fifth wheel, it would be possible to weld bar stock directly to the base plate; thus, forming the frame. These are just manufacturing choices.

Figure 8A:
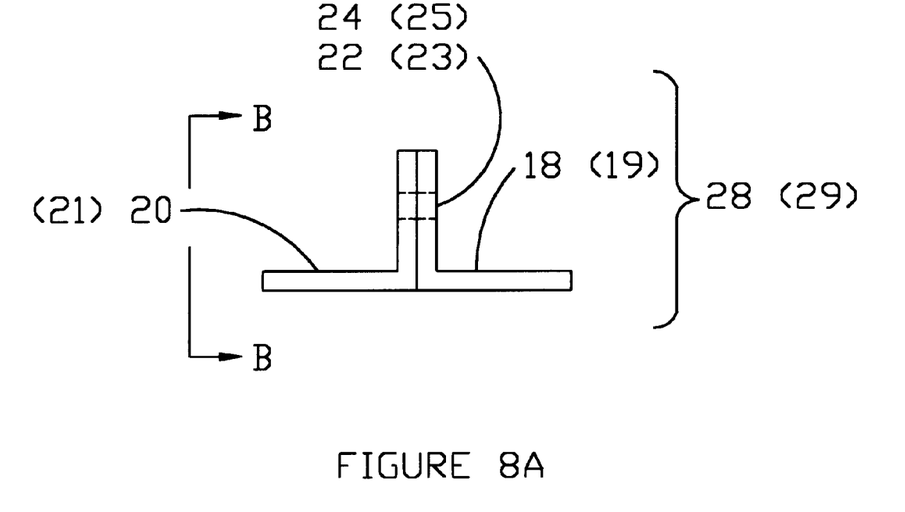
FIG. 8A is a side view of the transfer assembly taken from AA in FIG. 7.
Figure 8B:
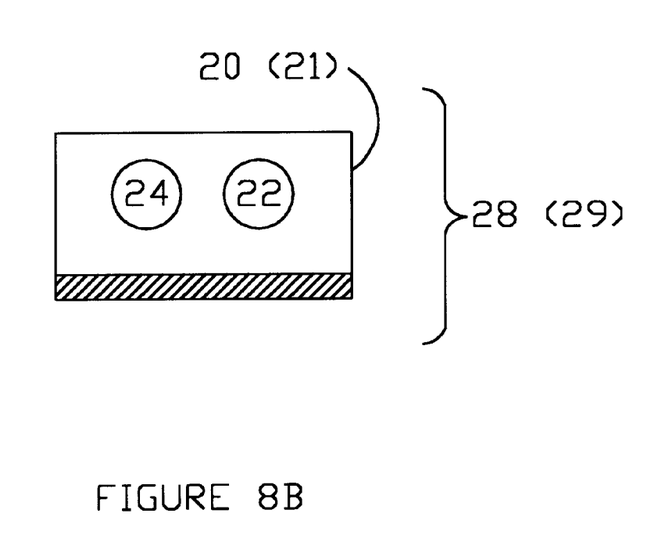
FIG. 8B is a sectional view of the transfer assembly taken from BB in FIG. 8A.

In addition to the frame and base plate, there are two shock load transfer brackets, 28 and 29, which are placed midway between the "front" and "back" of the housing and attached to the frame side and stiffener/spacer bar. It can be seen that the stiffener/spacer bar really is used to level the inside area where the transfer brackets are attached to the main housing. (Thus, for a light weight device or if the frame angle-iron lips were turned outwards, the spacer bars would not be needed.) The load transfer brackets are in turn formed from two pieces of angle-iron, 18 and 20 or 19 and 21, which are the same size as the frame angle-iron. (See FIGS. 8A and 8B.) As will be seen, these brackets transfer the shock load, picked up the shock absorbing springs, from the floating platform to the main housing and onto the towing vehicle. In the prototype device, these brackets were attached to the housing by bolts; however, welding would be appropriate. Appropriate holes are formed in the base plate for attachment to the truck bed.

Figure 3:
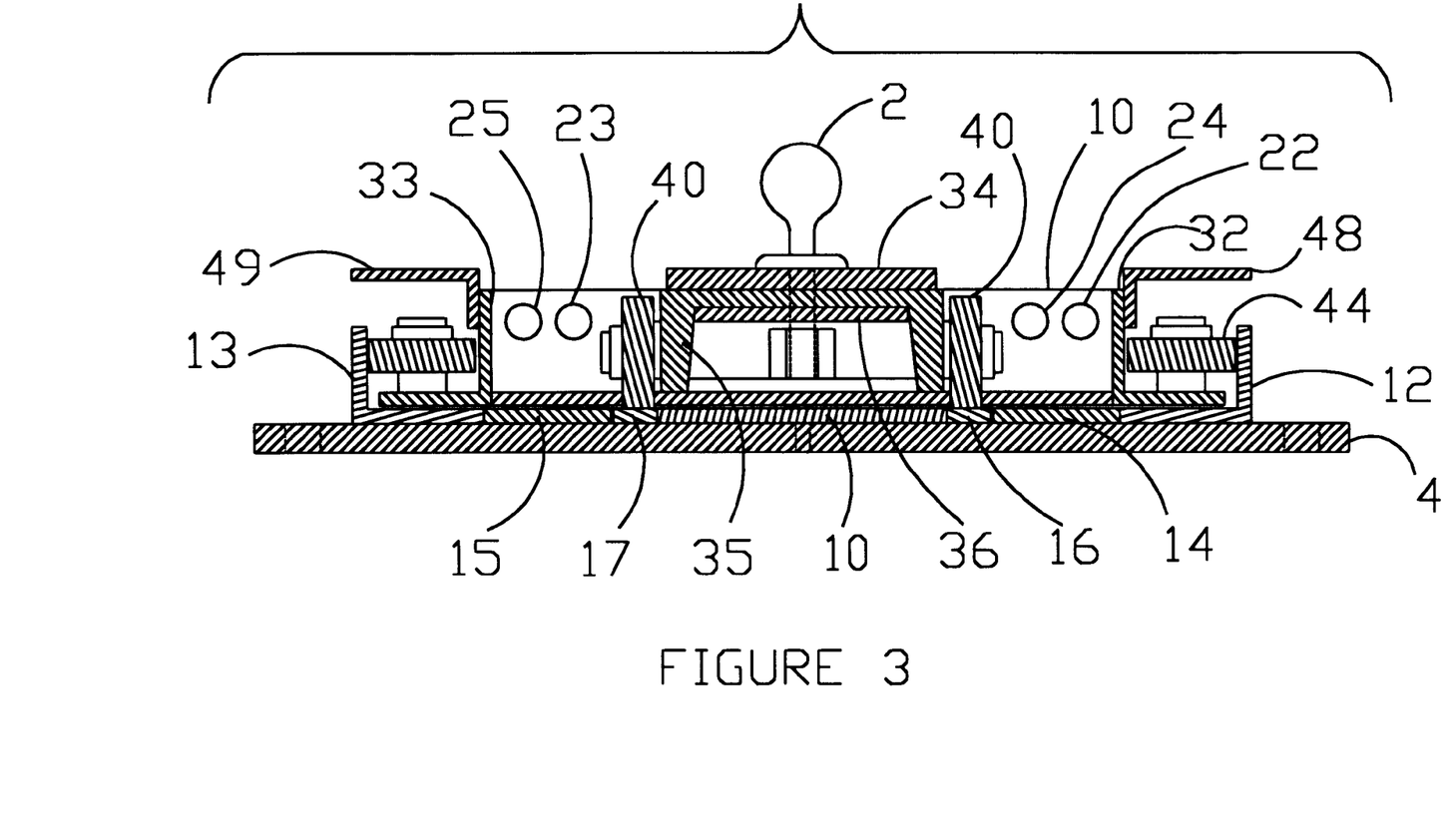
FIG. 3 is a cross sectional view of the instant invention without the upper housing and shock absorbing springs in place taken from section AA in FIG. 4.
Figure 9:
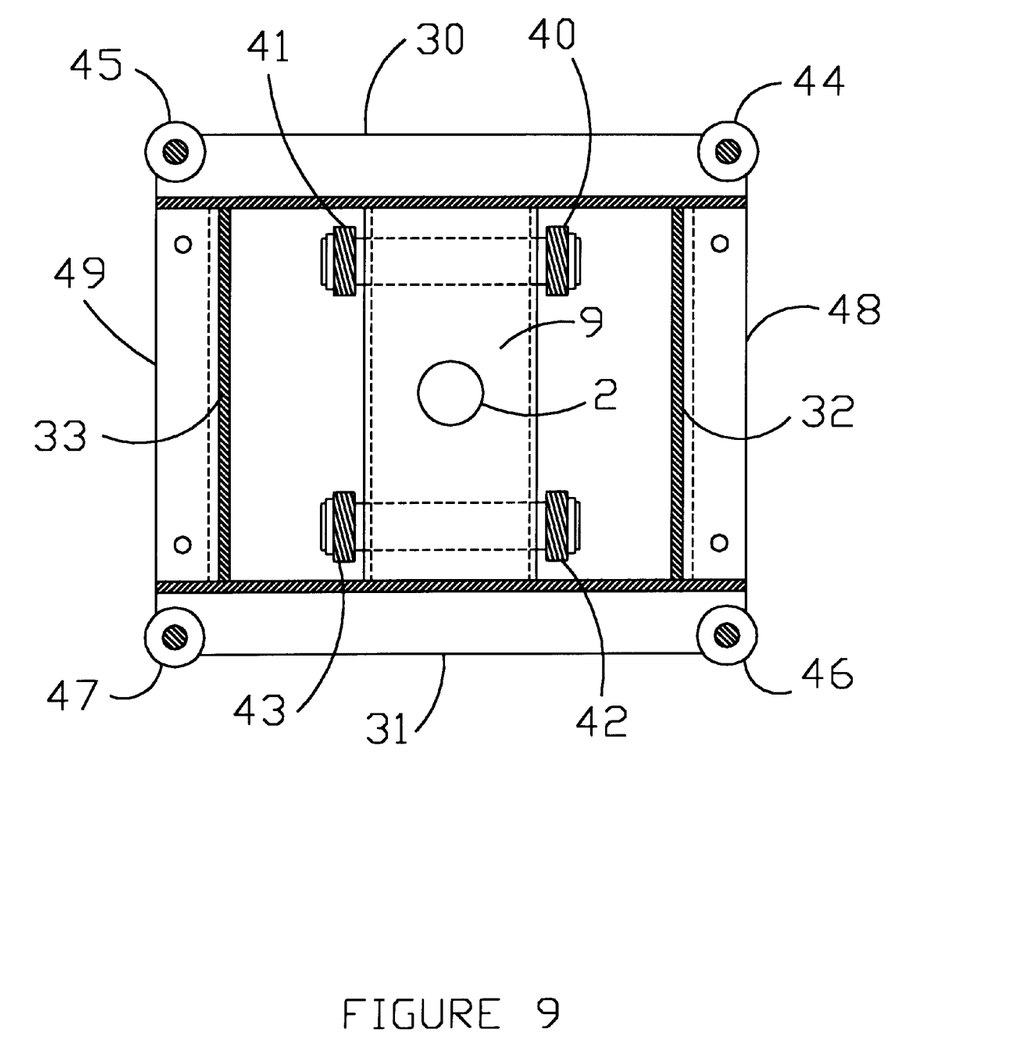
FIG. 9 is a plan view of the floating platform illustrating all of the associated parts.
Figure 10:
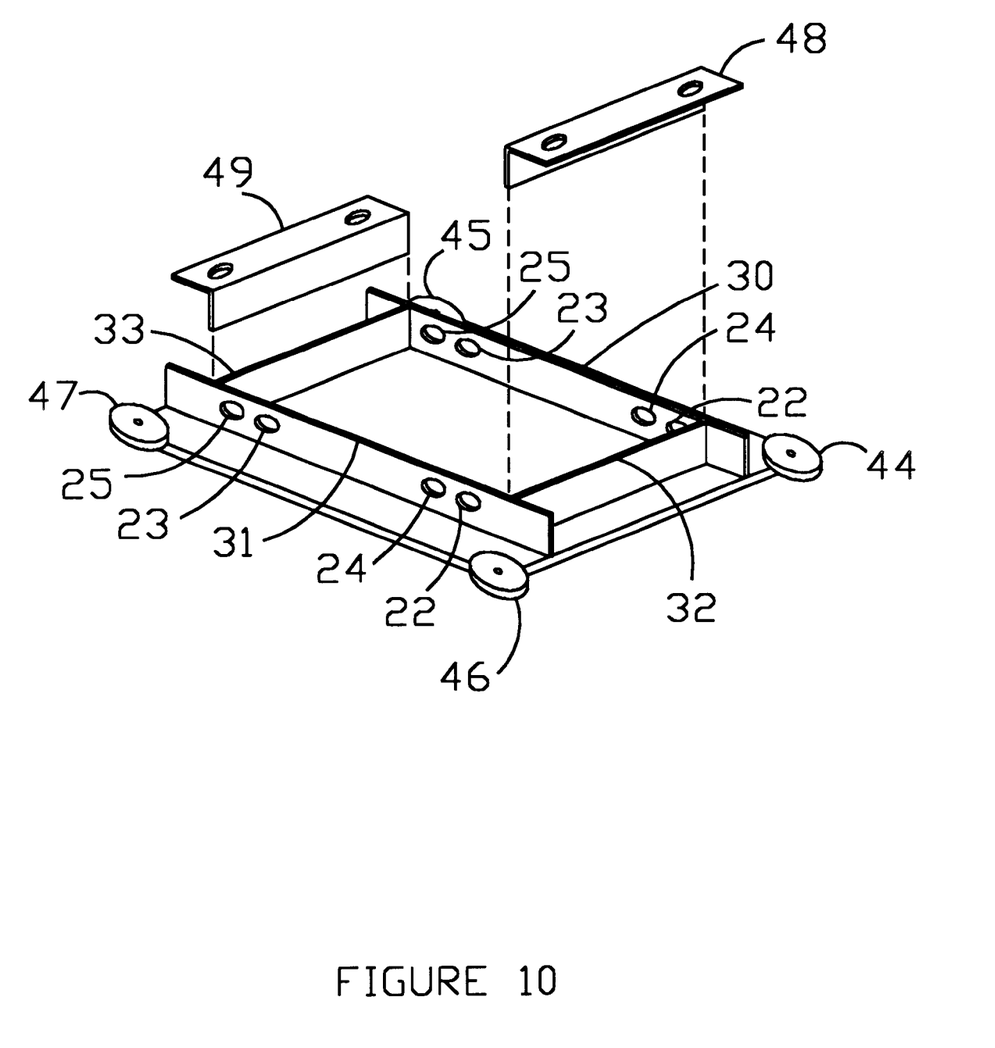
FIG. 10 is an exploded isometric view of the floating platform showing details of the frame construction.
Figure 11:
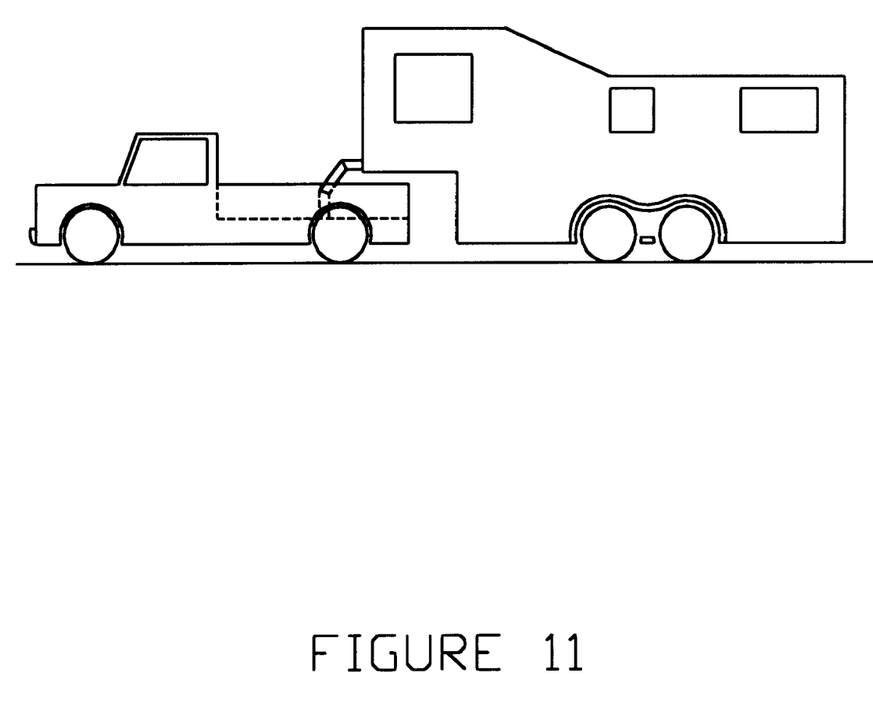
FIG. 11 shows a camper trailer utilizing the instant invention.
Figure 12:
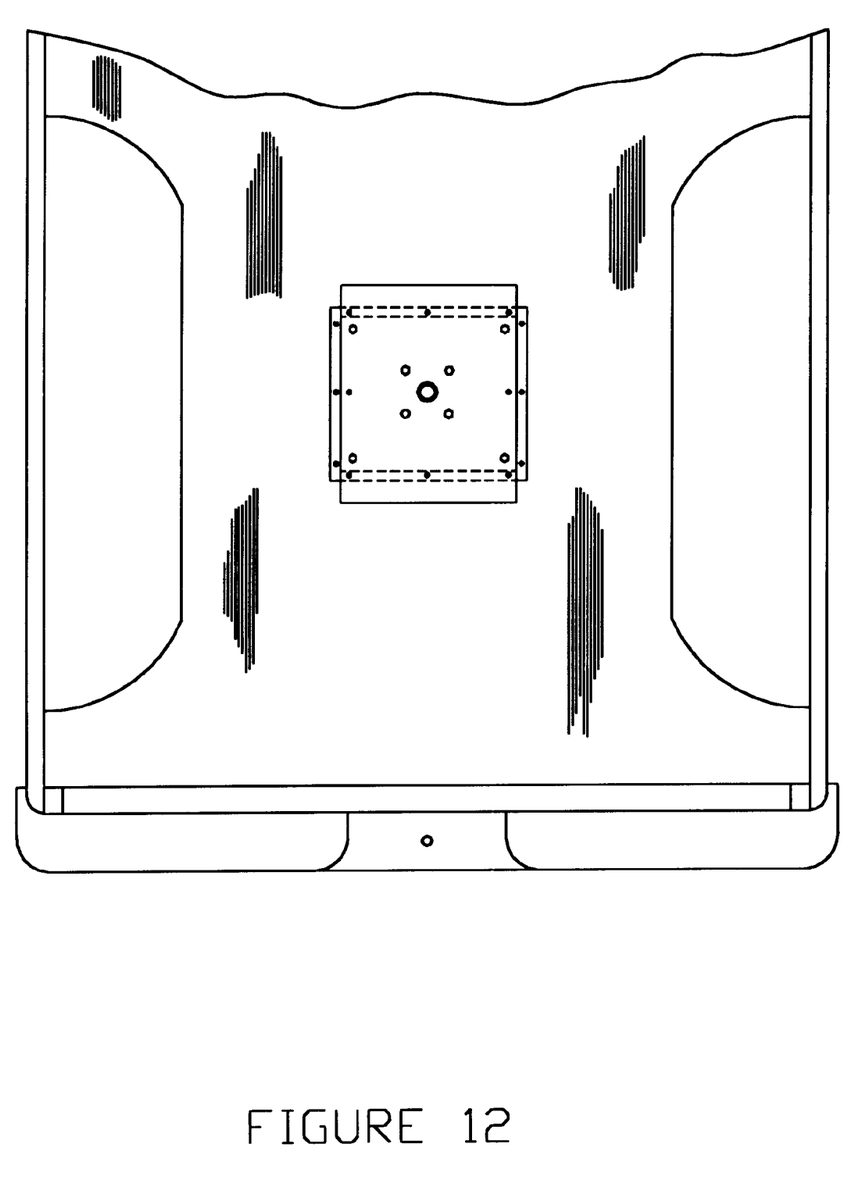
FIG. 12 shows the instant invention mounted on the bed of a pickup truck.
Figure 13:
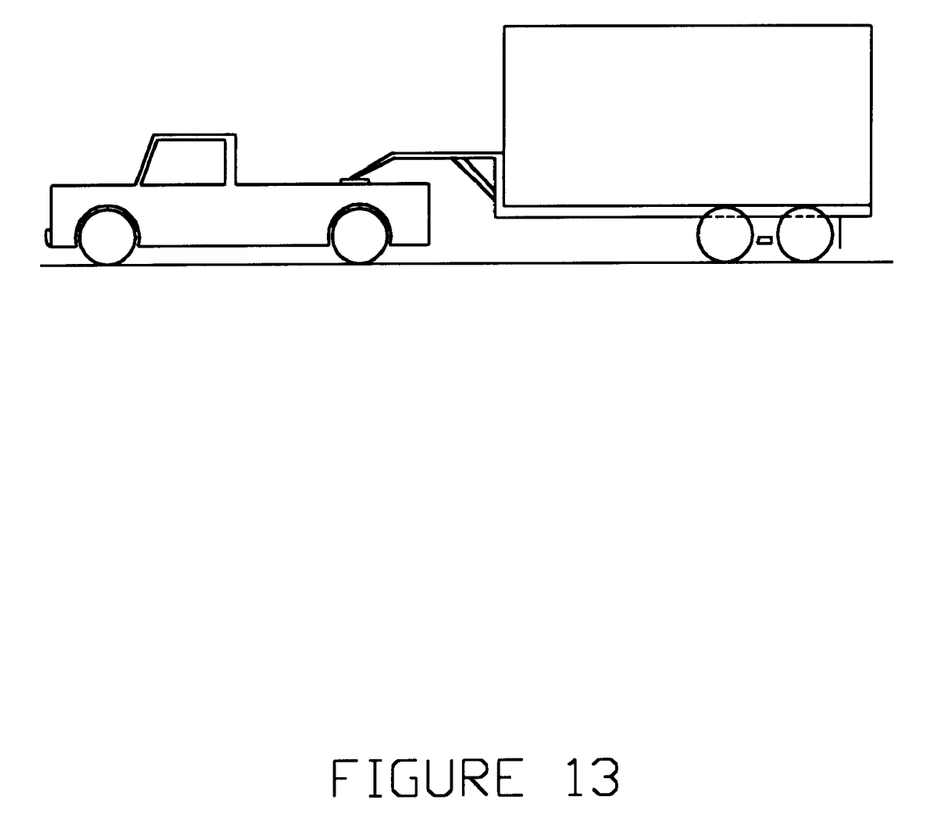
FIG. 13 shows a long-neck trailer utilizing the instant invention.
Figure 14:
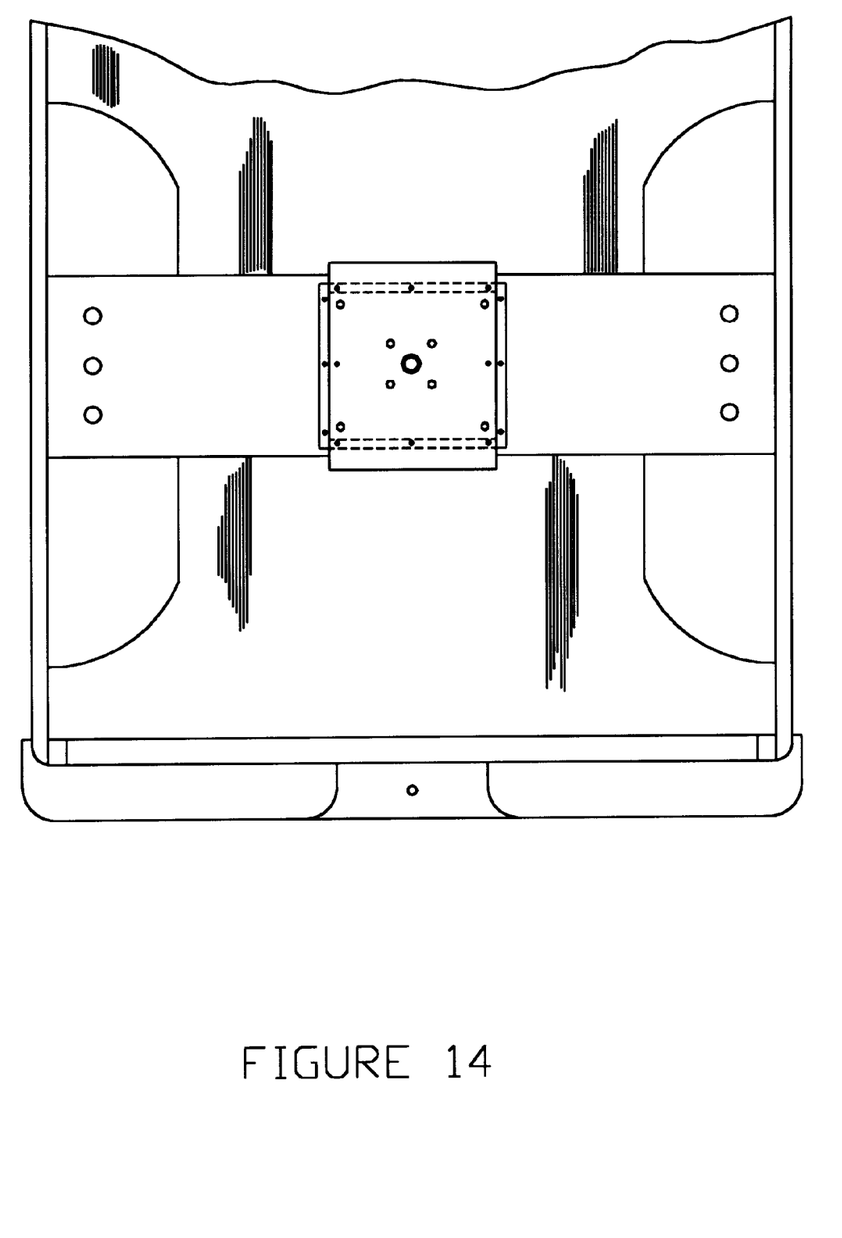
FIG. 14 illustrates an alternate method of mounting the instant invention on a pickup truck.

Turning to FIG. 3, FIG. 9 and FIG. 10, the floating platform, in general 6, will next be described. Like the main housing the floating platform has a frame made from angle-iron which can best be seen in FIG. 10. Four pieces of angle iron, 30, 31, 32, and 33, are welded together as shown. Four spring bolt holes, 22, 23, 24, and 25, are drilled through the "front" (30) and "back" (31) frame members. The use of these spring bolt holes will later be explained. Two additional pieces of inverted angle-iron, 48 and 49 are welded to the right and left frame sides respectively. The top of these two pieces are even with the upper ball stiffener plate, 34, and serve as a mounting or attachment point for the upper plate/housing, 3.

Side load roller bearings, 44, 45, 46, and 47, are placed horizontally at the right and left corners of the "front" and "back" floating platform frame angle iron members. The bearings are positioned so that outer walls of the bearings extend beyond the edges of the angle-iron and keep the floating frame from dragging on the main housing frame as will be seen.

A piece of channel iron, 35, is welded, midway between the right and left frame members to the front and back frame members. A stiffener plate, 34 and 36 is welded to the top and bottom sides of the channel iron; thus, forming the hitch assembly, 9. A standard trailer hitch, 2, is attached to the hitch assembly.

Finally, four load roller bearings, 40, 41, 42, and 43, are placed at the right and left corners of the "front" and "back" of the hitch assembly. The bearings are positioned vertically so that the outer walls of the bearings extend beyond the edges of the channel-iron, keep the floating frame from dragging on the main housing frame (as will be seen), and transfer the gravity (vertical) load to the main housing and onto the towing vehicle. These load bearings actually ride on the right and left load bearing bars, 16 and 17, in the main housing. As noted earlier, it is a manufacturing choice as to the bearing bars and although used in the prototype device, they may be left out.

Figure 4:
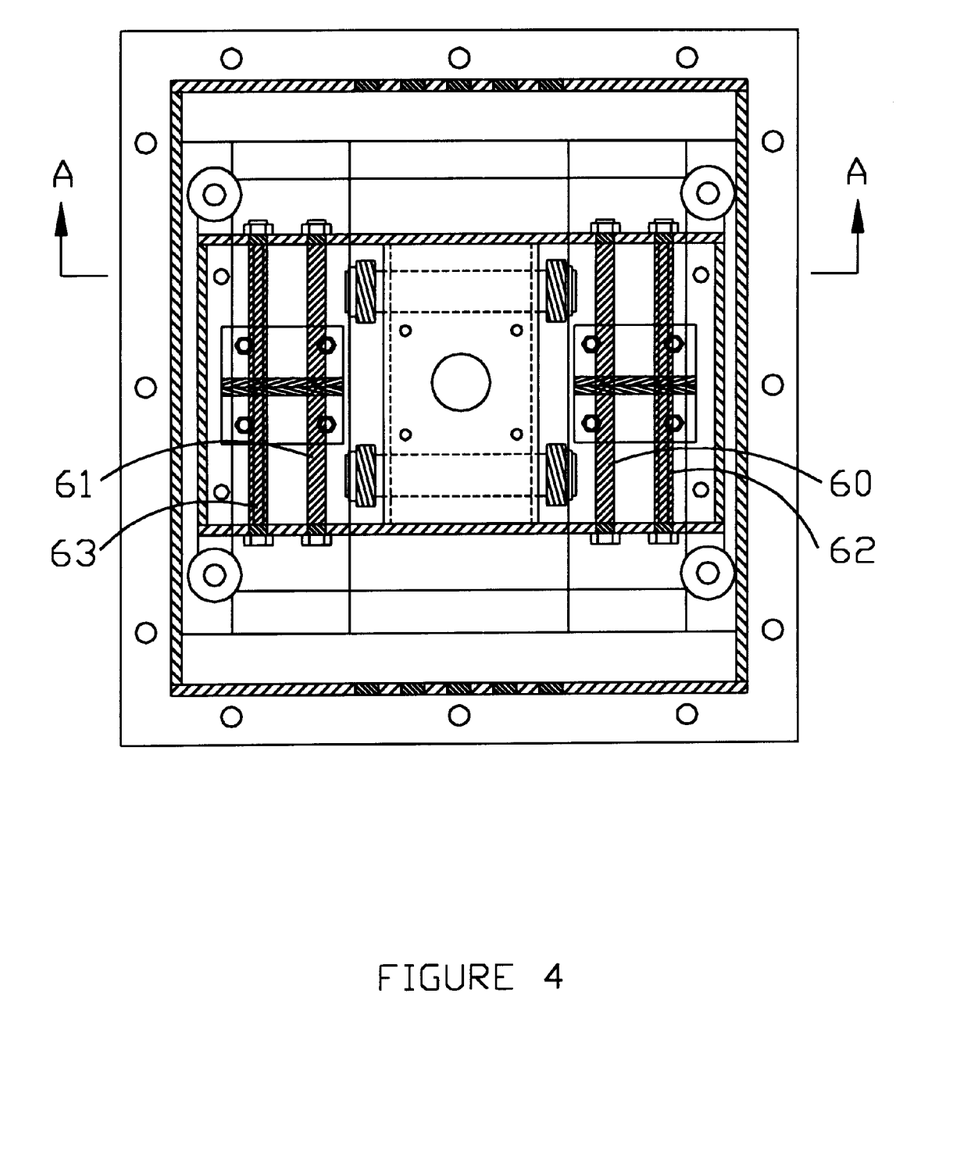
FIG. 4 is a plan view of the instant invention without the upper housing in place and without any of the shock absorbing springs in place.
Figure 5:
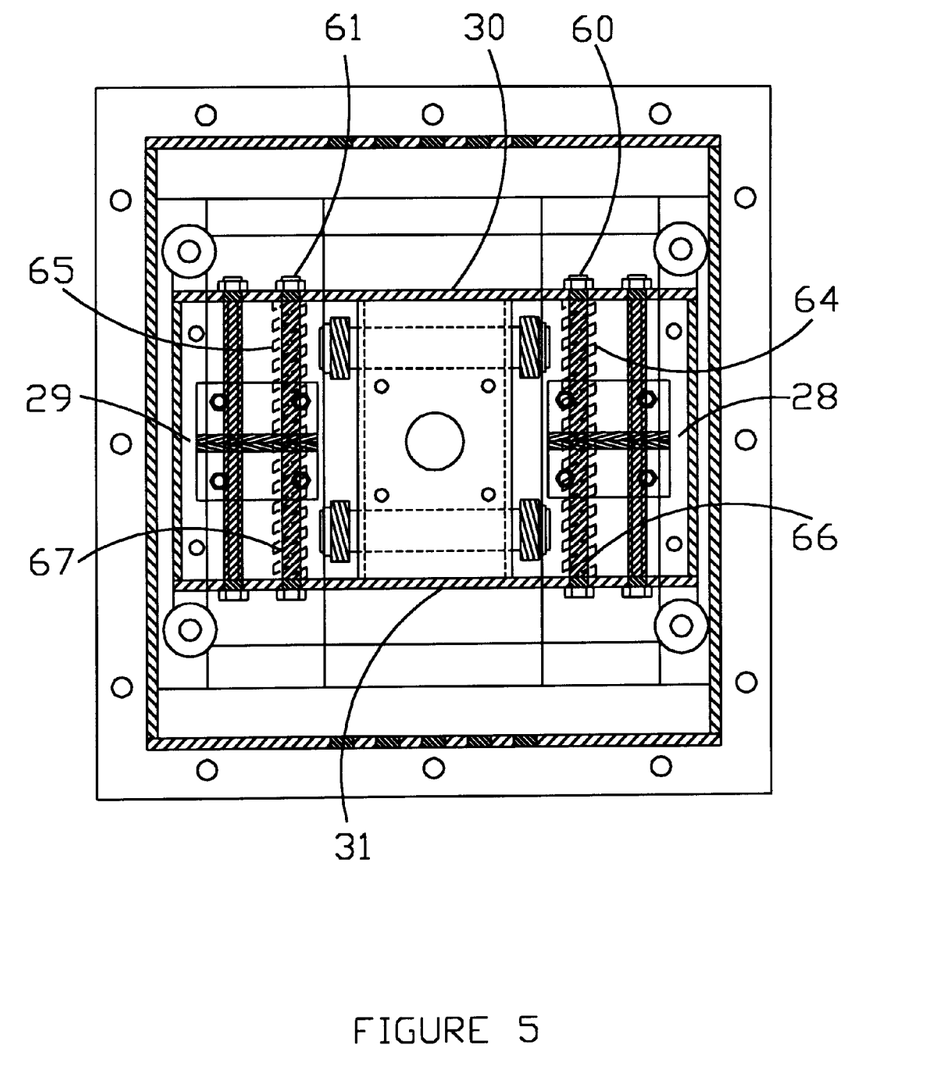
FIG. 5 is the same view of FIG. 4, but showing a set of shock absorbing springs in place.
Figure 6:
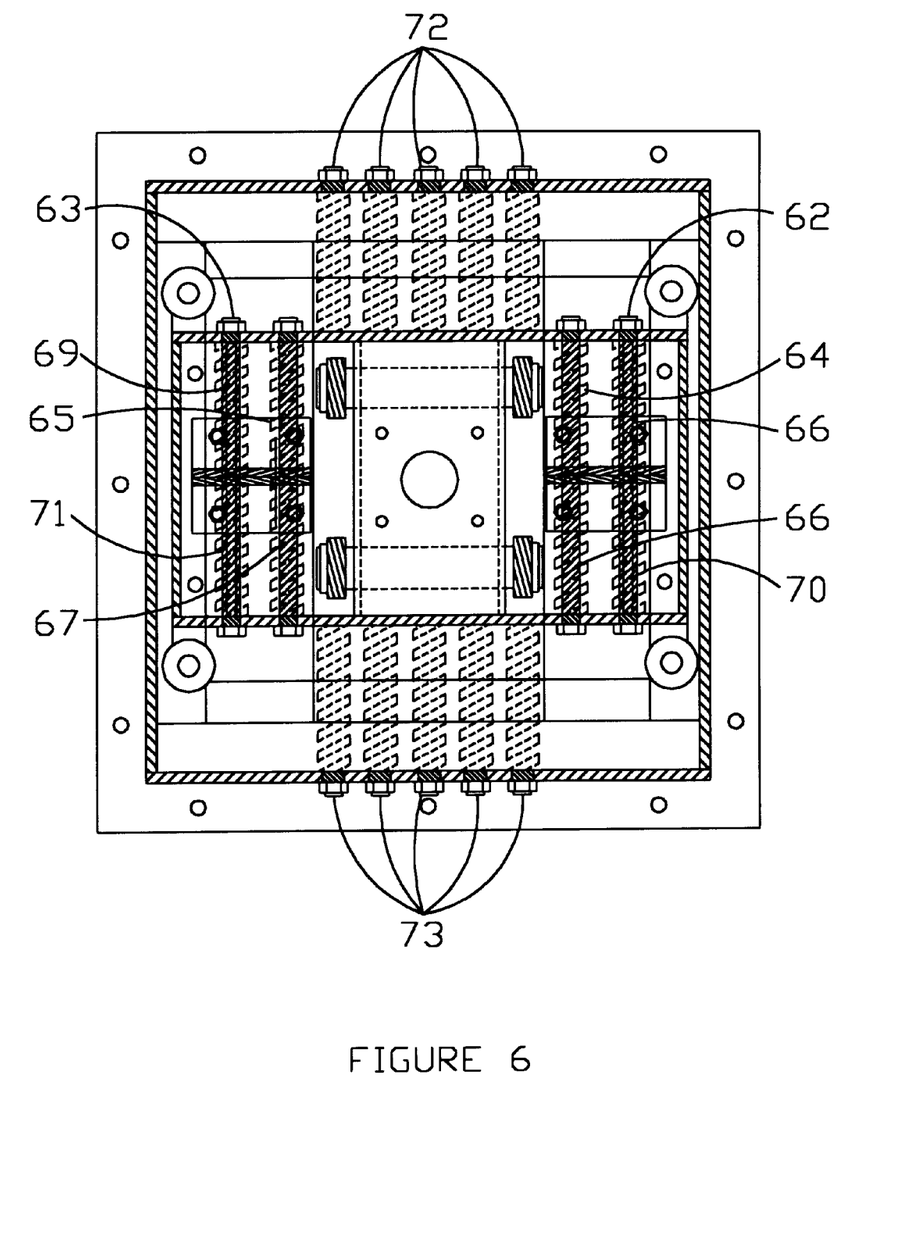
FIG. 6 is the same view of FIG. 4, but showing two sets of shock absorbing springs in place and illustrating additional ancillary springs by dotted lines.

The floating platform is placed within the main housing so that all spring bolt holes, 22, 23, 24, and 25, are aligned axially with each other as shown in FIG. 4 (or FIG. 5 or 6). Spring bolts, 60, 61, 62, and 64 pass through the bolt holes. These bolts readily pass through the bolt holes and, when the floating platform is properly riding on the load bearings, will not bind within the holes. These bolts serve to hold the floating platform vertically within the main housing and, as will be seen, also serve to retain the shock absorbing springs.

Finally, the moving parts and springs within the main housing are covered by a top plate, 3. The top plate is formed from a single piece of 14 gauge metal or heavier with the edges folded down forming a lip which passes over, around, and outside the main housing frame. The top housing/plate is supported by the moving platform parts 34, 48, and 49. If necessary, additional support brackets can be added to the floating platform: again, this is a manufacturing choice.

The action, choice and installation of the shock absorbing springs will now be examined. FIG. 5 shows four shock absorbing springs, 64, 65, 66, and 67, in place between the front floating platform frame member, 30, the load transfer brackets, 28 and 29, and the rear floating platform frame member, 31. The springs are in turn held in place by their respective spring bolts 60 and 61.

As has been explained, the floating platform is free to move within the main housing; however, it is constrained by the spring bolts and the springs. The spring bolts hold the shock absorbing springs in place and restrain up and down vertical movement of the floating platform. That is, the spring bolts keep the floating platform within the main housing. When the trailer hits a bump which causes a rearward reaction to the tow, the rearward set of shock springs will compress and absorb the rearward shock load that would ordinaringly be transferred directly to the towing vehicle. In a similar manner, a forward reaction will be absorbed by compressing the forward set of springs. Thus, shock loads are absorbed by the shock springs.

For light loads, the combined spring constants show be low and four springs will be sufficient. As the trailer load increases, the spring constant should be increased. Thus, a second set of springs will be needed as shown in FIG. 6. As can been seen in FIG. 6, additional springs, 64, 65, 66, and 67, can be installed between the front floating platform frame member, 30, the load transfer brackets, 28 and 29, and the rear floating platform frame member, 31. These springs are in turn held in place by their respective spring bolts 62 and 63.

There are several ways to increase the overall spring constant which is left up to the manufacturer or end user. Additional springs with the same constant may be added or the spring constant of the spring sets themselves may be increased. Furthermore, additional springs—ancillary springs—may be placed directly between the front (72) and rear frame members (73).

It can be seen that a manufacturer need only keep a reasonable quantity of springs with different spring constants to meet a wide range of load requirements. In fact, the end user (consumer) is able to change combined spring constants to meet varying load requirements. The formulae required to match load to spring constant are well known in the art, and any person skilled in suspensions may determine the proper constants and/or number of springs.

FIG. 4 clearly shows how the lateral or side load bearings transfer lateral (side to side) loads to the main housing. Thus, the floating platform is free to move within the main housing without binding laterally or vertically unlike the prior art. This simple fact means that shock absorbing quality will not be affected in any manner. For example, when making a turn, a side load will be imposed on the hitch and will be transferred to the floating platform. This side load must be transferred to the towing vehicle, and it will be transferred through the lateral or side load bearings, 44–47 without binding.

Although this invention has been described with a certain degree of particularity, it is understood that the present disclosure is made only by way of example of the invention and that numerous changes in the details of construction and the combination and arrangement of parts may be resorted to, as explained, without departing from the spirit and the scope of the invention as claimed. Further, the sizes of plate, dimensions, methods of construction, etc. should not be construed as a limitation as they represent the best mode currently envisioned by the inventor and could easily be improved in a manufactured device.

I claim:

1. A shock absorbing fifth wheel apparatus comprising:
    a) a floating platform having,
        a rectangular frame having four corners,
        a hitch assembly attached to said rectangular frame and further having vertical sides,
        a plurality of load bearing roller bearings vertically attached to said vertical sides of said hitch assembly,
        lateral load bearings horizontally attached to each of said four corners of said rectangular frame;
    b) a main housing having,
        a base plate,
        a rectangular frame attached to said base plate said frame having a front, a rear, and sides,
        a pair of transfer assemblies attached to said base plate midway between the front and rear of said frame and next to the two sides of said frame; and,
    c) plurality of shock absorbing springs;
    wherein said floating platform rolls on said base plate between said front and rear of said rectangular frame on said load bearings; wherein said lateral load bearings roll along said sides of said rectangular frame; and wherein said plurality of said shock absorbing springs attach between said front of said rectangular frame to the front thereof and said transfer assembly and to said assembly and attach between said rear of said rectangular frame to the rear thereof and said transfer assembly and to said transfer assembly.

2. The apparatus of claim 1 further comprising a top housing attached to said floating platform whereby said top housing encloses said floating platform and said main housing to protect said shock absorbing springs and said floating platform.

3. The apparatus of claim 2 further comprising a trailer ball attached to said floating platform.

4. The apparatus of claim 2 further comprising a standard heavy truck fifth wheel coupler attached to said floating platform.

5. The apparatus of claim 2 wherein said top housing is formed from a single sheet of steel having edges and wherein said edges are folded to form a lip wherein said lip passes over said frame of said main housing.

6. The apparatus of claim 2 having an ancillary set of shock absorbing springs consisting of a plurality of shock absorbing springs positioned between the front rectangular floating platform frame and the front rectangular main housing frame being attached to each frame thereof and a plurality of shock absorbing springs positioned between the rear rectangular floating platform frame and the rear rectangular main housing frame being attached to each frame thereof.

7. The apparatus of claim 6 further comprising a trailer ball attached to said floating platform.

8. The apparatus of claim 6 further comprising a standard heavy truck fifth wheel coupler attached to said floating platform.

9. The apparatus of claim 6 wherein said top housing is formed from a single sheet of steel having edges and wherein said edges are folded to form a lip wherein said lip passes over said frame of said main housing.

10. A shock absorbing fifth wheel apparatus comprising:
a) a floating platform having,
  a rectangular frame having four corners,
  a hitch assembly attached to said rectangular frame and further having vertical sides,
  a plurality of load bearing roller bearings vertically attached to said vertical sides of said hitch assembly,
  lateral load bearings horizontally attached to each of said four corners of said rectangular frame;
b) a main housing having,
  a base plate,
  a rectangular frame attached to said base plate said frame having a front, a rear, and sides,
  a pair of transfer assemblies attached to said base plate midway between the front and rear of said frame and next to the two sides of said frame;
c) plurality of shock absorbing springs;
d) top housing attached to said floating platform being formed from a single sheet of steel having edges and wherein said edges are folded to form a lip wherein said lip passes over said rectangular frame of said main housing; and,
e) a trailer ball attached to said floating platform;
wherein said floating platform rolls on said base plate between said front and rear of said rectangular frame on said load bearings; wherein said lateral load bearings roll along said sides of said rectangular frame; and wherein said plurality of said shock absorbing springs attach between said front of said rectangular frame to the front thereof and said transfer assembly and to said assembly and attach between said rear of said rectangular frame to the rear thereof and said transfer assembly and to said transfer assembly.

11. The apparatus of claim 10 having an ancillary set of shock absorbing springs consisting of a plurality of shock absorbing springs positioned between the front rectangular floating platform frame and the front rectangular main housing frame being attached to each frame thereof and a plurality of shock absorbing springs positioned between the rear rectangular floating platform frame and the rear rectangular main housing frame being attached to each frame thereof.

12. The apparatus of claim 10 wherein the base plate is about 19½ by 19½ inches, the main housing frame is about 17½ by 17½ by ¼ inches thick, the floating platform frame is about 16½ by 12 and ¼ thick, and the upper housing is about 17¾ by 17¾ and ¼ inches thick and wherein said lip of said upper housing is about one inch.

* * * * *